United States Patent
Li et al.

(10) Patent No.: US 12,228,711 B2
(45) Date of Patent: Feb. 18, 2025

(54) LENS AND ITS LENS BUTTON ADJUSTMENT STRUCTURE

(71) Applicants: GUANGDONG SIRUI OPTICAL CO., LTD., Zhongshan (CN); Zhongshan AZU Optoelectronics Technology Co., Ltd., Zhongshan (CN)

(72) Inventors: Jie Li, Zhongshan (CN); Mingyi Liu, Zhongshan (CN)

(73) Assignees: GUANGDONG SIRUI OPTICAL CO., LTD., Zhongshan (CN); Zhongshan AZU Optoelectronics Technology Co., Ltd., Zhongshan (CN)

(*) Notice: Subject to any disclaimer, the term of this patent is extended or adjusted under 35 U.S.C. 154(b) by 260 days.

(21) Appl. No.: 17/962,583

(22) Filed: Oct. 10, 2022

(65) Prior Publication Data

US 2024/0085677 A1 Mar. 14, 2024

(30) Foreign Application Priority Data

Sep. 9, 2022 (CN) .......................... 202211108687.1

(51) Int. Cl.
*G02B 7/02* (2021.01)
*G02B 13/08* (2006.01)

(52) U.S. Cl.
CPC ............. *G02B 13/08* (2013.01); *G02B 7/026* (2013.01)

(58) Field of Classification Search
None
See application file for complete search history.

(56) References Cited

U.S. PATENT DOCUMENTS

| | | | | |
|---|---|---|---|---|
| 3,989,358 A * | 11/1976 | Melmoth | ............. | G01B 5/0002 359/813 |
| 8,189,279 B2 * | 5/2012 | Chen | ................... | F16M 11/046 359/822 |
| 8,547,652 B2 * | 10/2013 | Bornschein | ............ | G02B 7/004 359/830 |
| 2011/0292527 A1 * | 12/2011 | Frankovich | ............ | G02B 7/005 359/824 |
| 2016/0252701 A1 * | 9/2016 | Richter | ................... | G02B 7/026 359/830 |
| 2017/0082820 A1 * | 3/2017 | Jin | ........................ | G02B 7/023 |
| 2020/0026029 A1 * | 1/2020 | DeWitt, IV | ............ | G02B 7/023 |
| 2020/0292916 A1 * | 9/2020 | Huang | ................... | G03B 11/00 |

\* cited by examiner

*Primary Examiner* — Darryl J Collins
(74) *Attorney, Agent, or Firm* — Loeb & Loeb LLP

(57) ABSTRACT

The application discloses a lens and its button adjustment structure. The button adjustment structure includes a connecting seat, a guidepost, a base and an elastic member. The connecting seat is fixedly connected to the lens or may be part of the lens. The connecting seat includes a first gear structure. The guidepost is fixed on a fixed member on one side of the connecting seat. The base is movably sleeved on the guidepost along an axial direction of the guidepost. The base includes a second gear structure. The elastic member is sleeved on an outer periphery of the guidepost and is located between the base and the fixed member. An elastic force of the elastic member drives the second gear structure on the base to engage the first gear structure of the connecting seat.

17 Claims, 4 Drawing Sheets

LENS AND ITS LENS BUTTON ADJUSTMENT STRUCTURE

CROSS-REFERENCE TO RELATED APPLICATION

This application claims priority to a Chinese patent application number 202211108687.1, filed on Sep. 9, 2021, whose disclosure is incorporated by reference in its entirety herein.

TECHNICAL FIELD

The present application relates to the technical field of variable-width lenses, and in particular, to a lens and its lens button adjustment structure.

BACKGROUND

Anamorphic lens is generally heavier and longer than normal ones. Therefore, a few the directions to improve over the existing technology includes miniaturization and easy adjustment of the master anamorphic lens.

At present, the shape of the common anamorphic lens is generally round or circular. To adjust the lens, a user may adjust parts of the lens by maneuvering an external portion of the lens body and the lens may then move longitudinally. After the adjustment, the lens is generally not locked. To lock it, an external clamp or mechanism is needed to engage the external portion. Such mechanism typically includes a knob to tighten to lock the lens. However, the operation of tightening the knob is inconvenient, and the knob is prone to be loosen after use. The knob may also be lost, leaving the mechanism inoperable.

SUMMARY

Therefore, the technical problem to be solved by this application is to overcome the shortcomings of the inconvenient operation and easy loosening of the knob in the prior art method of locking the lens with a knob. Embodiments of the invention provide a lens button adjustment structure and a lens, such that the user may easily press the button to achieve the purpose of adjusting the lens and locking the lens.

In solving the above-mentioned technical problems, the technical scheme of the present application is as follows:

According to embodiments of the invention, a button adjustment structure includes a connecting seat. In one aspect, the connecting seat may be fixedly or securely connected to the lens or may be part of the lens. In one aspect, the connecting seat includes a first gear structure.

Embodiments of the invention may further include a guidepost and it may be fixed, secured or disposed on a fixed member on one side of the connecting seat.

Embodiments of the invention may further include a base, and it may be movably sleeved on the guidepost along an axial direction of the guidepost. The base may include a second gear structure.

Embodiments of the invention may further include an elastic member. In one aspect, the elastic member is sleeved on an outer periphery of the guidepost and is located between the base and the fixed member. An elastic force of the elastic member drives the second gear structure on the base to engage the first gear structure of the connecting seat.

In a further embodiment, the size of the connecting seat is similar or identical to that of the lens to which it connects.

In a further embodiment, the connecting seat comprises an oval ring shape.

In a further embodiment, the connecting seat may include an annular groove, and the annular groove is disposed towards the direction of the base, and the first gear structure is set on a side wall of the annular groove. In one embodiment, the base may include a main body that is disposed on one side of the connecting seat and a engaging member that is connecting to the main body and extending into the annular groove. In one aspect, the second gear structure may be arranged on one end of the engaging member that is facing the first gear structure.

In a further embodiment, the main body may provide a stepped opening with two ends to receive the guidepost, and the guidepost may include a limit surface that abuts against a stepped surface of the stepped opening of the main body. In one aspect, the elastic force of the elastic member drives the stepped surface of the main body to abut against the limiting surface of the guidepost.

In a further embodiment, the guidepost includes a guide pin. In one aspect, a top end of the guide pin has a cross-shaped groove or a straight-line groove and an outer wall of a lower end of the guide pin has an external thread, and the guide pin is connected to the fixed member through the external thread.

In a further embodiment, a button cap may be disposed on an end of the base, wherein the button cap may be disposed above the guidepost.

In a further embodiment, the base may include a guide opening in an axial direction that is parallel to an axis of the stepped opening. In one aspect, the guide opening may receive a guide pole, and a lower end of the guide pole may be connected to the fixed member.

In a further embodiment, a lens includes the above-mentioned lens button adjustment structure.

In a further embodiment, the lens may be an anamorphic lens.

Aspects of the invention may provide the following advantages:

1. The lens button adjustment structure of the present application, in one embodiment, includes a connecting seat, a guidepost, a base and an elastic member. When the lens needs to be adjusted or locked, the base is pressed by a user, and the base may slide along the guidepost, the elastic member is compressed, and the second gear structure on the base may separate from the first gear structure on the connecting seat. This may able movement of the lens and the connecting seat. When the base is released, the elastic force of the elastic member lifts the base, and the second gear structure on the base and the first gear structure of the connecting seat are engaged, thus restricting the movements of the connecting seat and the lens. Thus, this lens and its button adjustment structure has the advantages of a simple structure, small appearance, ease of operations and high performance.

2. The connecting seat of the lens button adjustment structure of the present application, in one embodiment, may provide an annular groove on a side facing the base with the first gear structure arranged on the side wall of the groove of the annular groove. In one aspect, the engaging member of the base may extend into the annular groove, thus achieving a compact design and the structure.

3. In the lens button adjustment structure of this application in one embodiment, the guidepost may be connected to the stepped opening of the base. The base and the guidepost may be offset by the cooperation of the stepped surface and the limit surface, which has the further advantages of simple structure and manufacturing method.

4. The lens button adjustment structure of this application, in a further embodiment, may include a guide pin with an external thread at the lower end and a cross-shaped groove or a straight-line groove at the upper end as the guidepost, which is convenient to use a screwdriver tool to lock and fix the guidepost on the fixed element.

5. The lens button adjustment structure of the present application, in a further embodiment, may include the button cap, which is small in size, and it is convenient for the user operation by pressing down the base.

6. The lens button adjustment structure of this application, in a further embodiment, may provide the guide pole that guides or directs the movement of the base, which can prevent the base from derailing or being deflected during the pressing or rebounding process.

7. The lens of this application, in a further embodiment, may adopt the above-mentioned lens button adjustment structure. In one aspect, the user only needs to simply press the button cap to rotate the lens to achieve the adjustment thereof. The lens may be small in size with simple internal structure and high performance. It is further beneficial to realize the design of being light weight, compact in size, and simplification of operation of the lens, especially for the anamorphic lens.

BRIEF DESCRIPTION OF THE DRAWINGS

In order to more clearly illustrate the specific embodiments of the present application or the technical solutions in the prior art, the accompanying drawings that need to be used in the description of the specific embodiments or the prior art will be briefly introduced below. The drawings are some embodiments of the present application. For those of ordinary skilled in the art, other drawings can also be obtained from these drawings without any creative effort.

REFERENCE NUMBER LABELS

100: connecting seat; 101: annular groove; 102: first gear structure; 200: guidepost; 300: base; 310: main body; 311: stepped opening; 320: engaging member; 321: second gear structure; 400: elastic member; 500: button cap; 600: guide pole.

DETAILED DESCRIPTION

The technical solutions of the present application may be clearly and completely described below with reference to the accompanying drawings. Obviously, the described embodiments are part of the embodiments of the present invention, but not all of the embodiments. Based on the embodiments in the present application, all other embodiments obtained by those of ordinary skilled in the art without creative efforts shall fall within the protection scope of the present application.

In the description of this application, it should be noted that the terms "center", "upper", "lower", "left", "right", "vertical", "horizontal", "inner", "outer", etc., where indicated orientation or positional relationship is based on the orientation or positional relationship shown in the accompanying drawings, which is only for the convenience of describing the present application and simplifying the description, rather than indicating or implying that the indicated device or element must have a specific orientation or a specific orientation, construction or operation, and therefore should not be construed as limitations on this application. Furthermore, the terms "first", "second", and "third" are used for descriptive purposes only and should not be construed to indicate or imply relative importance.

In the description of this application, it should be noted that, unless otherwise expressly specified and limited, the terms "installed", "engaged with" and "connected to" should be understood in a broad sense, for example, it may be a fixed connection or a detachable connection, or connection in one piece or an integral way. In another example, it may be a mechanical connection or an electrical connection; it may be a direct connection or an indirect connection through an intermediate medium, and it may be an internal communication of two elements. For those of ordinary skilled in the art, the specific meanings of the above terms in this application may be understood in specific situations.

Figure 1:
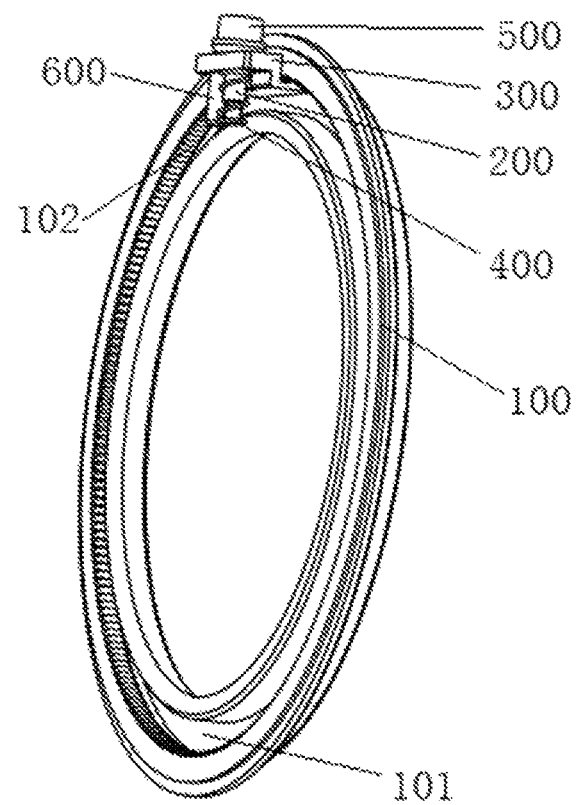
FIG. 1 is a schematic three-dimensional structural diagram of a lens button adjustment structure according to one embodiment.
Figure 2:
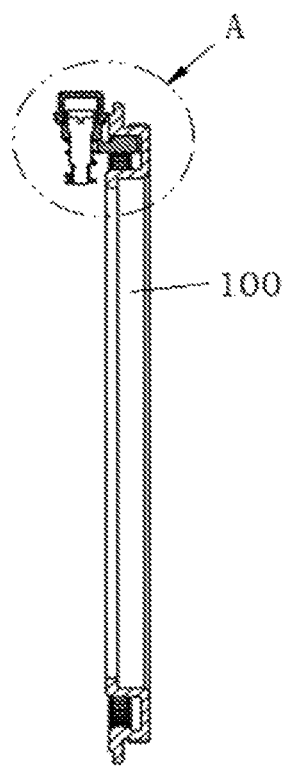
FIG. 2 is a side cross-sectional view of a lens button adjustment structure according to one embodiment.
Figure 3:
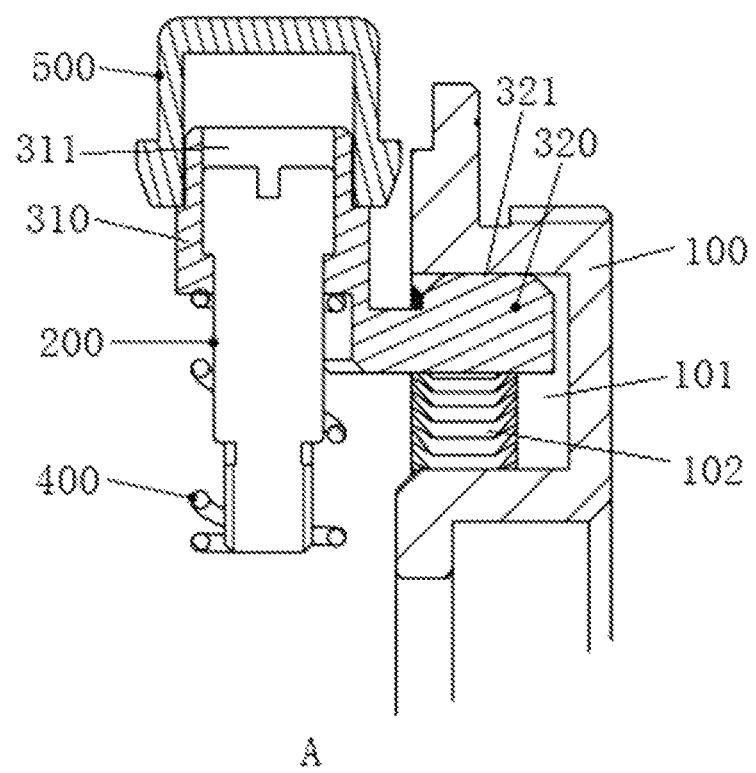
FIG. 3 is the enlarged view of a position A in FIG. 2.
Figure 4:
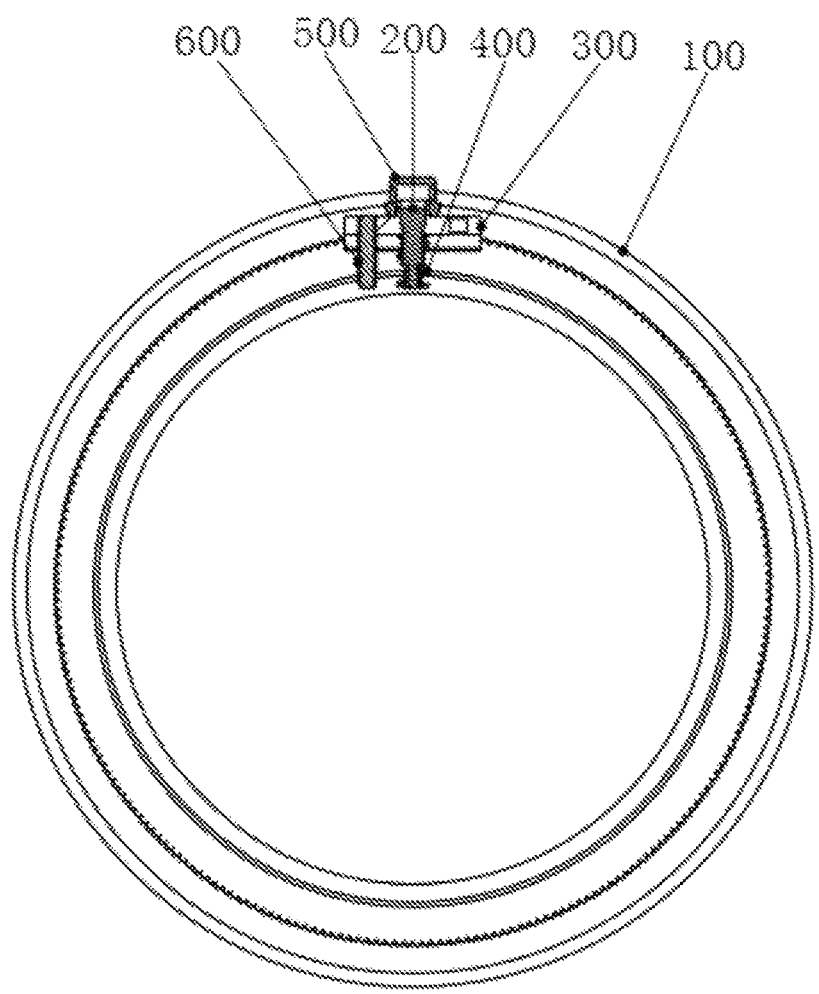
FIG. 4 is a front cross-sectional view of a lens button adjustment structure according to one embodiment.
Figure 5:
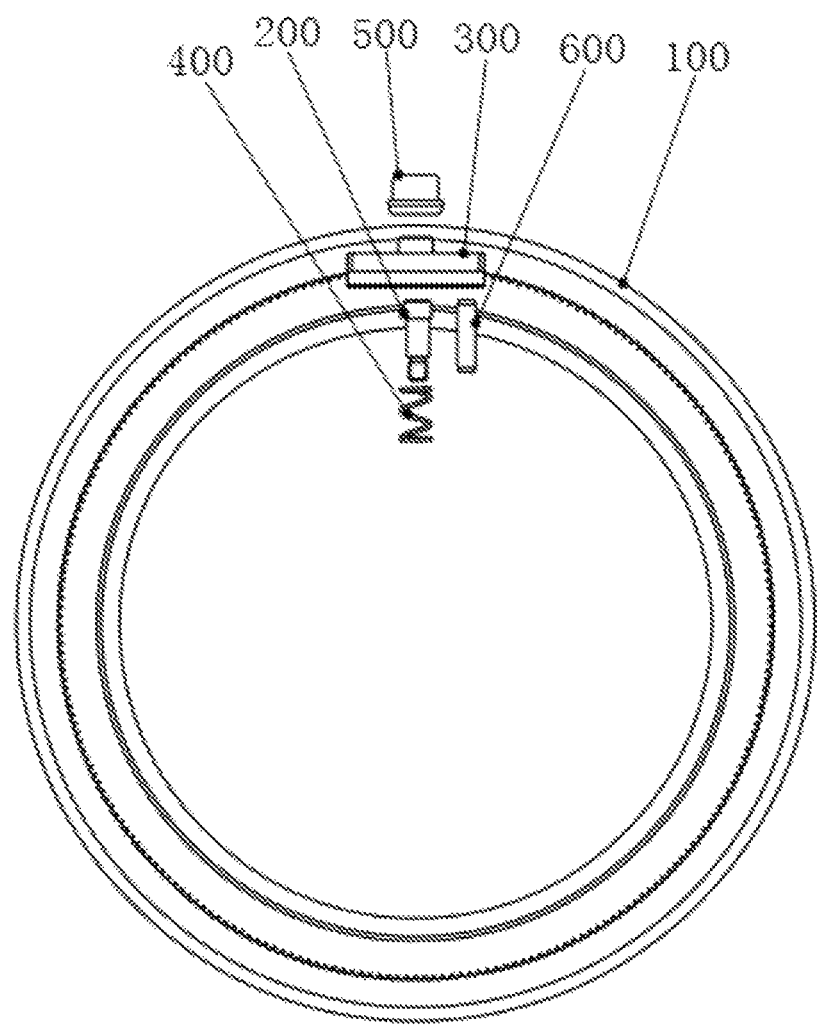
FIG. 5 is a schematic diagram of an exploded structure of a lens button adjustment structure according to one embodiment.

As shown in FIGS. 1-5, a lens button adjustment structure may include a connecting seat 100, a guidepost 200, a base 300, and an elastic member 400. In one embodiment, the connecting seat 100 may be fixedly connected to the lens or may be a part of the lens, and the connecting seat 100 may be provided with a first gear structure 102; the guidepost 200 may be fixed on a fixed member on one side of the connecting seat 100. The axial movable sleeve may be sleeved on the guidepost 200, and the base 300 may be provided with a second gear structure 321. The elastic member 400 may be sleeved on an outer circumference of the guidepost 200 and may be disposed between the base 300 and the fixed member (not shown in the figure). In one aspect, the elastic force of the elastic member 400 drives the second gear structure 321 on the base 300 to engage with the first gear structure 102 on the connecting seat 100.

In another embodiment, when the lens may need to be adjusted, the user may press the base 300. In one aspect, the base 300 may slide or move along the guidepost 200, thus causing the elastic member 400 to be compressed. The second gear structure 321 of the base 300 and the first gear structure 102 of the connecting seat 100 may be released. This may result in rotating the connecting seat 100 and the lens, thus adjusting the lens. After the base 300 may be released, the elastic force of the elastic member 400 may push the base 300, and the second gear structure 321 engages with the first gear structure 102 on the connecting seat 100. At this time, the connecting seat 100 and the lens are fixed and cannot be rotated. Thus, the lens button adjustment structure has the advantages of having a simple or elegant structure, while small in size and appearance, as well as having an ease in operation with high performance.

In some specific implementations of this embodiment, the exterior size of the connecting seat 100 may be the same as that of the lens to which it may be connected. In one embodiment, the lens may be generally circular, and the connecting seat 100 may also be circular. Alternatively, the lens may be directly connected to the connecting seat 100.

In one embodiment, the connecting seat 100 may constitute a fixed outer frame or the housing. In one embodiment, the connecting seat 100 is made of a metal or plastic material.

In some specific implementations of this embodiment, the connecting seat 100 may be provided with an annular groove 101, a direction of the annular groove 101 may be disposed toward the direction of the base 300. The first gear structure 102 may be disposed on the upper groove wall of the annular groove 101. The base 300 may be made of a metal or plastic material. The base 300 may include a main body 310 disposed on one side of the connecting seat 100 and an engaging member 320 integrally formed on one side of the main body 310 and extending into the annular groove 101. The second gear structure 321 may be disposed on the engaging member 320 facing the first gear structure 102. In this way, the compact design of the button structure can be realized, and the overall structure can be made more compact. In addition, the side wall of the lower part of the annular groove 101 may act as a limiting block for the engaging member 320 to prevent the base 300 from being pressed too much. The first gear structure 102 may be a ring of gear structure arranged on the sidewall of the upper part of the annular groove 101. When the first gear structure 102 and the second gear structure 321 engage with each other, the teeth of second gear structure 321 may engage with the teeth of the first gear structure 102.

In some specific implementations of this embodiment, the main body 310 is provided with a stepped opening 311 penetrating through both ends. In one embodiment, the guidepost 200 is connected to the stepped opening 311, and the guidepost 200 has a limit surface that is in contact with the stepped surface of the stepped opening 311. The elastic force of the elastic member 400 drives the stepped surface of the main body 310 and the limiting surface of the guidepost 200 to abut against each other. Such a design has the advantages of an elegant structure and convenient assembly of the guidepost 200 and the base 300.

In some specific implementations of this embodiment, the guidepost 200 may be a guide pin made of a metallic material, and the top end of the guide pin may include a cross-shaped groove or a straight-line groove. In one embodiment, the outer wall of the lower end of the guide pin may include an external thread, and the guide pin may be securely or fixedly connected with the fixed member through the external thread. Hence, making it convenient to use a screwdriver tool to lock and secure the guidepost 200 to the fixed member.

In some specific implementations of this embodiment, a button cap 500 may be connected to the upper end of the base 300, and the button cap 500 is disposed directly above the guidepost 200. The connection mode of the button cap 500 and the base 300 may be a fixed connection or screw connection. In one embodiment, the button cap 500 may be made of plastic. In the non-pressed state, the upper end face of the button cap 500 may protrude over the plane from the outer end face of the connecting seat 100 to facilitate pressing of the button cap 500 by the user. When the button cap 500 is pressed to its designated place or position, the upper end face of the button cap 500 and the outer end face of the connecting seat 100 is flushed.

In some specific implementations of this embodiment, the elastic member 400 may be a spring.

In some specific implementations of this embodiment, the base 300 may be further provided with a guide opening. In one embodiment, the guide opening may be in an axial direction that is parallel to an axis of the stepped opening 311. In one aspect, the guide opening may receive a guide pole 600, and the guide pole 600 may be in an axial direction that is parallel to an axis of the guidepost 200. In one embodiment, a lower end of the guide pole 600 may be connected to the fixed member of the guidepost 200. The guide pole 600 may be made of a metallic material. In one embodiment, the guide pole 600 may guide or direct the movement of the base 300, which can prevent the base 300 from derailing or being deflected during the pressing or rebounding process.

An embodiment of the present application further provides a lens, including the lens button adjustment structure described above. In one embodiment, the lens may be an anamorphic lens. In one aspect, when the user wishes to adjust the lens of the anamorphic lens using the above lens button adjustment structure, the user only needs to simply press the button cap 500 to rotate or adjust the lens. The lens button adjustment structure has the advantages of a small or compact size, a simple internal structure and high performance. These advantages make the lens button adjustment structure to be lightweight, small in size, and easy-to-operate design.

Obviously, the above-mentioned embodiments are only examples of the description, and are not intended to limit the implementation manner. For those of ordinary skilled in the art, changes or modifications in other different forms can also be made on the basis of the above description. There is no need and cannot be exhaustive of all implementations here. And the obvious changes or changes derived from this are still within the scope of protection created by the present application.

What is claimed is:

1. A lens button adjustment structure comprising:
   a connecting seat (100), being connected to a lens or being part of the lens,
   wherein the connecting seat (100) comprises a first gear structure (102);
   a guidepost (200) disposed on a fixed member on one side of the connecting seat (100);
   a base (300) sleeved in the guidepost (200) and moveable in an axial direction as the guidepost (200), wherein the base (300) comprises a second gear structure (321); and
   an elastic member (400) being sleeved on an outer periphery of the guidepost (200) and being disposed between the base (300) and the fixed member, wherein an elastic force of the elastic member (400) drives the second gear structure (321) on the base (300) to engage the first gear structure (102) of the connecting seat (100).

2. The lens button adjustment structure of claim 1, wherein the connecting seat (100) comprises the same size as the lens to which the connecting seat (100) is connected.

3. The lens button adjustment structure of claim 2, wherein the connecting seat (100) comprises a circular shape.

4. The lens button adjustment structure of claim 1, wherein the connecting seat (100) comprises an annular groove (101), wherein a direction of the annular groove (101) is disposed toward a direction of the base (300), wherein the first gear structure (102) is disposed on an upper portion of the annular groove (101), wherein the base (300) comprises a main body (310) disposed on one side of the connecting seat (100) and an engaging member (320) integrally formed on one side of the main body (310) and extending into the annular groove (101), wherein the second gear structure (321) is disposed on the engaging member (320) facing the first gear structure (102).

5. The lens button adjustment structure of claim 4, wherein the main body (310) comprises a stepped opening (311) penetrating through both ends, wherein the guidepost (200) is connected to the stepped opening (311), wherein the guidepost (200) comprises a limit surface for contacting with a stepped surface of the stepped opening (311), wherein the elastic force of the elastic member (400) drives the stepped surface of the main body (310) and the limiting surface of the guidepost (200) to abut against each other.

6. The lens button adjustment structure of claim 5, wherein the base (300) comprises a guide opening, wherein the guide opening is parallel to the stepped opening (311) axially, wherein the guide opening comprises a guide pole (600), wherein a lower end of the guide pole (600) is connected to the fixed member of the guidepost (200).

7. The lens button adjustment structure of claim 1, wherein the guidepost 200 comprises a guide pin, wherein a top end of the guide pin comprises a cross-shaped groove or a straight-line groove, wherein an outer wall of the lower end of the guide pin comprises a thread, wherein the guide pin is securely or fixedly connected with the fixed member through the thread.

8. The lens button adjustment structure of claim 1, wherein the guidepost (300) comprises a button cap (500) on a top end thereof, wherein the button cap (500) is disposed above the guidepost 200.

9. A lens comprising:
  a lens button adjustment structure, wherein the lens button adjustment structure comprising:
  a connecting seat (100), being connected to a lens or being part of the lens, wherein the connecting seat (100) comprises a first gear structure (102);
  a guidepost (200) disposed on a fixed member on one side of the connecting seat (100);
  a base (300) sleeved in the guidepost (200) and moveable in an axial direction as the guidepost (200), wherein the base (300) comprises a second gear structure (321); and
  an elastic member (400) being sleeved on an outer periphery of the guidepost (200) and being disposed between the base (300) and the fixed member, wherein an elastic force of the elastic member (400) drives the second gear structure (321) on the base (300) to engage the first gear structure (102) of the connecting seat (100).

10. The lens button adjustment structure of claim 9, wherein the lens comprises an anamorphic lens.

11. The lens of claim 9, wherein the connecting seat (100) comprises the same size as the lens to which the connecting seat (100) is connected.

12. The lens of claim 11, wherein the connecting seat (100) comprises a circular shape.

13. The lens of claim 9, wherein the connecting seat (100) comprises an annular groove (101), wherein a direction of the annular groove (101) is disposed toward a direction of the base (300), wherein the first gear structure (102) is disposed on an upper portion of the annular groove (101), wherein the base (300) comprises a main body (310) disposed on one side of the connecting seat (100) and an engaging member (320) integrally formed on one side of the main body (310) and extending into the annular groove (101), wherein the second gear structure (321) is disposed on the engaging member (320) facing the first gear structure (102).

14. The lens of claim 13, wherein the main body (310) comprises a stepped opening (311) penetrating through both ends, wherein the guidepost (200) is connected to the stepped opening (311), wherein the guidepost (200) comprises a limit surface for contacting with a stepped surface of the stepped opening (311), wherein the elastic force of the elastic member (400) drives the stepped surface of the main body (310) and the limiting surface of the guidepost (200) to abut against each other.

15. The lens of claim 14, wherein the base (300) comprises a guide opening, wherein the guide opening is parallel to the stepped opening (311) axially, wherein the guide opening comprises a guide pole (600), wherein a lower end of the guide pole (600) is connected to the fixed member of the guidepost (200).

16. The lens of claim 9, wherein the guidepost (200) comprises a guide pin, wherein a top end of the guide pin comprises a cross-shaped groove or a straight-line groove, wherein an outer wall of the lower end of the guide pin comprises a thread, wherein the guide pin is securely or fixedly connected with the fixed member through the thread.

17. The lens of claim 9, wherein the guidepost (300) comprises a button cap (500) on a top end thereof, wherein the button cap (500) is disposed above the guidepost 200.

* * * * *